United States Patent [19]
Reese et al.

[11] 3,865,680
[45] Feb. 11, 1975

[54] AUTOMOBILE WINDSHIELD AND ITS METHOD OF FABRICATION

[75] Inventors: Thomas J. Reese, Sarver; Harry S. Koontz, Pittsburgh, both of Pa.

[73] Assignee: PPG Industries, Inc., Pittsburgh, Pa.

[22] Filed: Mar. 29, 1972

[21] Appl. No.: 239,033

[52] U.S. Cl............. 161/125, 65/107, 65/288, 117/37 R, 117/123 B, 117/211, 117/212, 117/229, 161/146, 161/192, 161/196, 161/199, 219/543, 219/547, 338/309
[51] Int. Cl................................ C03b 23/02
[58] Field of Search........... 161/196, 192, 146, 199, 161/125; 156/102, 196, 272, 275; 65/103, 107, 288, DIG. 4; 219/153, 543, 547, 522; 338/306, 307, 308, 309; 117/211, 212, 229, 37 R, 123 B, 43

[56] References Cited
UNITED STATES PATENTS

| | | | |
|---|---|---|---|
| 2,871,623 | 2/1959 | Marini | 65/107 X |
| 3,248,195 | 4/1966 | Golightly et al. | 65/107 |
| 3,281,227 | 10/1966 | Leflet, Jr. et al. | 65/107 X |
| 3,329,490 | 7/1967 | Jendrisak | 65/107 X |
| 3,340,037 | 9/1967 | Stevenson | 65/107 X |
| 3,414,457 | 12/1968 | Rugg | 161/199 X |
| 3,553,833 | 1/1971 | Jochim et al. | 219/522 X |
| 3,634,654 | 1/1972 | Peetz et al. | 219/522 |
| 3,659,079 | 4/1972 | Whittemore | 219/522 |
| 3,721,594 | 3/1973 | Tarnopol et al. | 156/102 X |
| 3,762,903 | 10/1973 | Hamilton et al. | 65/107 |

FOREIGN PATENTS OR APPLICATIONS

942,132  11/1963  Great Britain

*Primary Examiner*—Marion F. McCamish
*Attorney, Agent, or Firm*—Edward I. Mates

[57] ABSTRACT

A window comprising one or more glass sheets having a sharply bent portion extending from edge to edge across a dimension of the sheet, a pattern of electroconductive material comprising an elongated electroconductive portion bonded to one or both of said sheets in said sharply bent portion and approximately coextensive with the sharply bent portion, and further comprising an additional edge portion of electroconductive material bonded to the glass sheet extending from each end of said elongated electroconductive portion from a narrow edge portion contacting said elongated portion to a wider edge portion remote from said elongated portion. The contacting portion of the edge portion preferably has an electrical resistance per unit length that approximates that of the elongated portion while the remote, wider edge portion has a lower electrical resistance. The elongated portion is preferably composed of an electroconductive material having a linear coefficient of thermal expansion compatible with that of glass.

29 Claims, 7 Drawing Figures

PATENTED FEB 11 1975
3,865,680
SHEET 2 OF 3

AUTOMOBILE WINDSHIELD AND ITS METHOD OF FABRICATION

BACKGROUND OF THE INVENTION

This invention relates to shaped windows, preferably of the type suitable for use as automobile windows. The present invention has been specifically utilized in connection with V-shaped laminated windshields or V-shaped backlights in which a sharply bent portion of the installed windshield or backlight extends transversely of an elongated window from one longitudinal side edge thereof to its other longitudinal side edge. The V-shaped window is symmetrical about its sharply bent portion. The present invention is also suitable for use in a compound windshield or backlight or sidelight in which one region of the window is sharply bent into the roof of the vehicle in a substantially horizontal plane from another portion that extends across the front, side, or rear of the vehicle. In addition, the present invention is also suitable for use in fabricating rear-quarter windows for station wagons having a main portion extending forward of the vehicle from a sharply bent corner and a rear portion extending along the rear of the vehicle from the sharply bent corner.

In addition to automotive glass, the present invention is also suitable for use in bay windows for buildings which include a flat central portion spaced outward from the frame of the building and angularly disposed flat glass end portions extending inward from each end of the central portion. Other glass shapes having sharply bent portions are also made possible by the present invention.

Various techniques have been developed to produce a windshield having a sharply bent region. Various patents such as U.S. Pat. Nos. 2,111,392 to Henry J. Galey; 2,176,999 to Robert A. Miller; 2,215,228 to James G. Oliver; and 3,248,195 to James S. Golightly and Harold E. McKelvey suggest various methods and apparatus employing electrical heaters for imparting a relatively sharp bend to a glass sheet. Furthermore, U.S. Pat. No. 2,871,623 to Herman R. Marini and U.S. Pat. No. 3,260,584 to Alfred E. Badger suggest using a heat absorbing material which reradiates heat into a portion to be relatively sharply bent compared to other portions. The heat absorbing material is removed after the glass is shaped. Furthermore, it is also well known to bond electroconductive material onto a surface of a glass sheet in the form of an electrical resistance heating circuit. U.S. Pat. Nos. 2,557,983 to Cyril S. Linder; 2,569,773 to Leighton E. Orr; 2,648,752 to Arnold E. Saunders; 2,648,754 to William O. Lytle; 2,710,900 to Cyril S. Linder; 2,877,329 to Romey A. Gaiser; 2,993,815 to A. W. Treptow; 3,287,684 to Albert Armbruster; 3,302,002 to Robert A. Warren; 3,467,818 to John D. Ballentine; and 3,484,583 and 3,484,584 to Hugh E. Shaw provide examples of electroconductive heating circuits bonded to a surface of a ceramic or glass sheet. To the best of our knowledge, bus bars supplying current to the electrical heating circuit are more electroconductive than the heating circuit in prior art circuits, even at portions connecting the bus bars to the circuit.

It has been suggested in the prior art to groove the glass in the region of sharp bending. U.S. Pat. Nos. 3,241,936 and 3,281,227 to Herbert A. Leflet, Jr. depict this technique. Such grooving weakens the glass.

Sharp localized bending has also been accomplished by bonding a heat reflecting coating on a portion of a surface opposite the surface facing a heat source. British Patent No. 942,132 to George Hubble describes such a method.

A method of localized heating using an electroconductive element bonded to a portion of a glass sheet surface is found in Canadian Patent No. 867,466 to Friedrich Jochim et al.

It has been found that heating circuits in the past have been interconnected between bus bars disposed along the opposite edges of the glass sheet. In the past, the bus bars have been of greater electroconductivity than that of the heating circuit elements in order to be able to have the voltage supply as great a proportion of energy to the heating elements with minimum loss of electrical energy to each bus bar. Such prior art configurations supplied power at maximum efficiency to the heating elements in the region where heat was desired.

In using a single elongated electroconductive heating strip with its ends contacting wide bus bars for applying electrical energy to heat the glass sheet locally along the line of the elongated strip of electroconductive material in the fabrication of V-shaped windows, considerable breakage was experienced. The present invention provides a method of reducing this breakage to a considerable extent.

SUMMARY OF THE INVENTION

The present invention provides a window comprising a glass sheet having a sharply bent portion extending from edge to edge across a dimension of the sheet, a pattern of electroconductive material comprising a first elongated electroconductive portion bonded to said sharply bent portion and approximately coextensive therewith and an additional edge portion of electroconductive material bonded to said glass sheet and extending along an edge of the sheet from each end of said elongated electroconductive portion. Each additional portion contacts one end of the first named elongated electroconductive portion. Each additional edge portion has an electrical conductivity per unit length that is approximately equal to that of said first named elongated electroconductive portion in its portion contacting said first named elongated electroconductive portion and greater in another portion remote from said contacting portion.

The elongated electroconductive portion is preferably composed of a metalo-ceramic composition and of the same composition as the additional edge portions. The metalo-ceramic composition preferably has a thermal coefficient that is approximately 45 to 90 times $10^{-7}$ inch per linear inch per degree Centigrade so that its coefficient of thermal expansion is compatable with that of the glass sheet on which it is applied.

The window preferably comprises a second glass sheet conforming in shape and outline to said first named glass sheet with means such as a polyvinyl acetal resin or a polyurethane resin adhering the glass sheets to one another in aligned relationship.

As an alternative, the second glass sheet can be omitted and the laminated window may consist essentially of the novel glass sheet described hereinbefore with an adhering layer of flexible plastic resin such as a polyvinyl acetal or a polyurethane resin bonded thereto.

While the monolithic or laminated window described herein may be a V-shaped windshield having a sharply bent portion extending across the width of the glass sheet to form two main portions symmetrically arranged with respect to said sharply bent portion, the present invention is equally adapted for any configuration of glass that incorporates a sharply bent portion extending completely across a glass sheet from one edge to an edge opposite thereto.

It is preferred, but not necessary, that the additional edge portions of electroconductive material connected to the ends of the first named elongated electroconductive portion be symmetrically arranged with respect to its connection to the elongated electroconductive portion that is aligned with the line of sharp bending. Under such circumstances, each additional edge portion is provided with a central portion of less conductivity per unit length connected to the first named elongated electroconductive portion and two symmetrically arranged remote portions extending from the opposite ends of the connecting portion and having greater electrical conductivity than the centrally disposed connecting portion. However, it is understood that it is also within the scope of the present invention to provide additional edge portions along the opposite edges of one or more glass sheets that are not in symmetry with respect to their contacting portion. In fact, each additional edge portion may be provided with only one remote, more electroconductive portion extending from an end of the connected portion.

The novel construction of the circuit pattern comprising the first named elongated electroconductive heating portion and the additional electroconductive edge portions connected to the ends of the first named elongated electroconductive portion and extending along the opposite marginal edges of the glass sheet in the vicinity of the longitudinal ends of the electroconductive elongated portion is to insure that the temperature gradient along the edges of the glass in the vicinity of the ends of the electroconductive elongated portion is not so steep as to cause the glass to break because of thermal stresses but is sufficiently flat to minimize glass breakage in these regions during the bending operation.

The particular construction of the additional edge portions permits an operator to clamp an electrode to a portion of the additional edge portion that is highly conductive and enables electric heating of the glass to take place along its opposite edges as well as along the line of sharp bending in such a manner as to insure minimizing glass breakage along the glass edge. Prior to the present invention, spaced bus bars bonded to a glass sheet surface along opposite edges for distributing electrical current received from a voltage source through clamped electrodes were of much higher electroconductivity than heating elements interconnecting opposed bus bars. Such a circuit construction caused edge breakage when one or more elongated electroconductive portions extending between opposing bus bars were located only in a localized region where sharp bending was desired. The edge breakage seemed to be located in the vicinity of the sharply bent region. The present invention provides heating of the glass edge adjacent the ends of the region of sharp bending in such a manner that thermal gradients are minimized in this region and, hence, glass breakage during the bending operation due to thermal stresses reduced condsiderably. At the same time, the present invention minimized the loss of effective vision area in a window in which the novel pattern of electroconductive material is applied by allowing the additional portions to be located along the opposite edges of the glass in the region of sharpest bending.

Preferably, the first named elongated electroconductive portion and the additional electroconductive edge portions are of the same material and of uniform thickness so that they can be applied simultaneously in one coating operation. The non-uniformity in electrical resistance is obtained by constructing the additional electroconductive edge portions in such a manner that they have a relatively narrow portion contacting an end of the first named elongated electroconductive portion and one or more relatively wide portions remote from the connected portion. The relatively narrow portion preferably has a width approximating that of the first named elongated electroconductive portion. One or both of the relatively wide portions is connected to a source of voltage by clamping an electrode thereagainst.

The additional electroconductive edge portions are located adjacent the opposite edges of the glass sheet. Thus, when voltage is applied across the first named elongated electroconductive portion to accentuate the heating of the glass sheet portion in the vicinity of the first named elongated electroconductive portion, the resulting current also heats the glass edges in the vicinity of the ends of the first named elongated electroconductive portion. Having the relatively narrow portion of the additional electroconductive edge portions of higher resistance per unit length than the end portions causes the edge portions of the glass sheet to become heated when the line to be sharply bent is heated by the first named elongated electroconductive portion. This reduces the thermal gradient along the edge portion of the glass sheet adjacent the ends of the first named elongated electroconductive portion when the glass sheet is sharply bent by a combination of overall heating and localized intensive heating.

BRIEF DESCRIPTION OF THE DRAWINGS

In the drawings which form part of the present invention and wherein like reference numbers refer to like structural elements.

DESCRIPTION OF THE PREFERRED EMBODIMENTS

Figure 1:
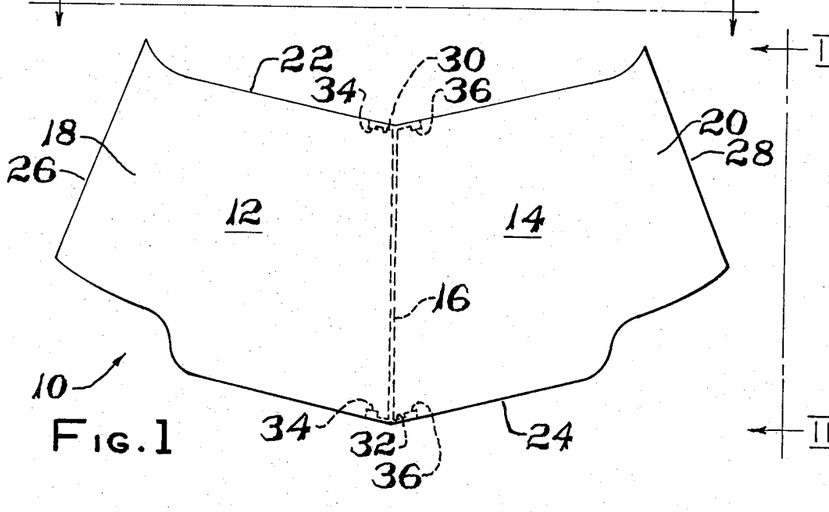
FIG. 1 is a front view of a V-shaped windshield containing a pattern of electroconductive material comprising an elongated electroconductive portion and additional electroconductive edge portions made according to the present invention.
Figure 2:
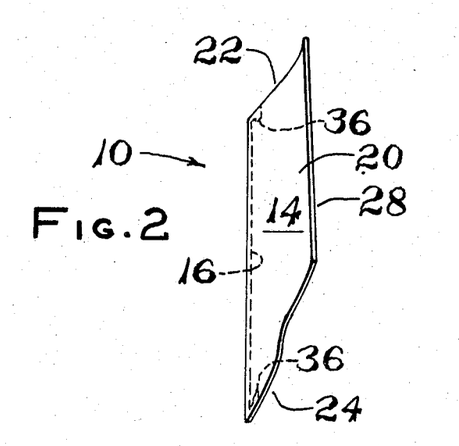
FIG. 2 is an end elevation of the windshield of FIG. 1, taken along the lines II—II of FIG. 1.
Figure 3:
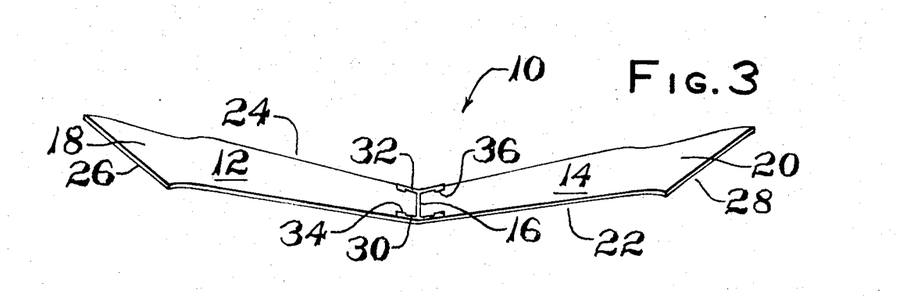
FIG. 3 is a top view taken along the lines III—III of FIG. 1.

In the drawings, reference number 10 refers to a so-called V-shaped windshield having two main portions 12 and 14 sharply bent with respect to one another along a transverse line of sharp bending covered by a thin elongated electroconductive portion 16 of a pattern of electroconductive material. The windshield may also comprise a pair of longitudinal end portions 18 and 20 that are bent with respect to their respective main portions 12 and 14. The windshield is provided with a marginal edge comprising a top edge 22 and a bottom edge 24 interconnected by end edges 26 and 28.

The first named longitudinally extending electroconductive portion 16 is disposed along a valley formed by the sharply bent transverse portion between main portions 12 and 14. One end of the thin, elongated, heating electroconductive edge portion of electroconductive material 16 is electrically connected to an additional electroconductive edge portion of electroconductive material 30 which extends along top edge 22; the other end of said first named elongated electroconductive portion 16 is electrically connected to an additional electroconductive edge portion 32 which extends along bottom edge 24. Each of the additional electroconductive edge portions 30 and 32 has a narrow portion whose width is approximately equal to the width of the thin first named elongated electroconductive portion 16 and one or more end portions 34 and 36 that are wider than the thin portion. The thin portion of additional electroconductive edge portion 30 contacts one end of this first named elongated electroconductive portion 16 while the thin portion of the other additional electroconductive edge portion 32 contacts the other end of the first named thin elongated electroconductive portion 16. The additional electroconductive edge portions are thus more electroconductive in their wider portions 34 and/or 36 and have a higher resistance per unit length in their portions connected to the ends of the first named elongated electroconductive portion 16.

The top edge 22, the bottom edge 24, and the end edges 26 and 28 of the window are constructed and arranged to conform within a frame of an automobile windshield opening, and, in a particular pattern for which the present invention was developed, has a sharp V-bend disposed centrally across the window from top edge 22 to bottom edge 24 such that the angle between main portion 12 and main portion 14 is 163 degrees at the top edge 22 gradually decreasing to 154 degrees at the bottom edge 24.

Preferably, the thin, elongated portion of electroconductive material 16 is a mixture of finely divided silver and a glass frit having a coefficient of thermal expansion between about 45 to 90 $\times$ 10$^{-7}$ inch per linear inch per degree Centigrade so that it is compatable with that of present commercial soda-lime-silica float, sheet or plate glass. A typical electroconductive material suitable for application by the so-called silk screening technique contains 65% by weight of finely divided silver, 20% by weight of a boro-silica frit and 15% by weight of an oil such as one known as "Squeegee" oil. The ceramic silver frit has a thermal expansion coefficient of approximately 50 to 55 times 10$^{-7}$ per degree Centigrade.

The additional electroconductive edge portions 30 and 32 are preferably of the same material as the thin elongated first named electroconductive portion 16. This enables one operation to suffice for applying both the elongated first named electroconductive portion 16 and the additional electroconductive edge portions 30 and 32 at the same time. A noble metal or an alloy of noble metals may also be used as the material for the electroconductive portions.

A metal clip 38 electrically connected to a voltage source (not shown) is used as a first electrode means to connect one of the wider portions 34 or 36 of additional electroconductive edge portion 30 to the source of potential while another clip 38 is used as another electrode means to connect a wider portion 34 or 36 of the other additional electroconductive edge portion 32 to said potential source.

A V-shaped backlight is produced by applying the silver ceramic frit composition in the desired pattern to the upper surface of a glass sheet. Preferably, apparatus such as disclosed and claimed in U.S. Pat. No. 3,638,564 to Bernard H. Prange and Dean W. Gintert, the disclosure of which is incorporated herein, is used to align the glass sheet in proper relation to a silk screen with the desired pattern thereon and then apply the metalo-ceramic-oil composition to the upper surface of the glass sheet through the pattern at a rate sufficient to form a coating approximately ½ to 1 mil thick.

The glass sheet with the first named elongated electroconductive portion and additional electroconductive edge portions applied thereto is mounted on a bending mold of an outline type and the glass supporting mold is subjected to an elevated temperature sufficient to heat the glass sheet to about the strain point of the glass and to fuse the frit onto the glass surface. When the glass reaches a suitable temperature in the vicinity of its strain point, voltage is applied between the additional electroconductive edge portions 30 and 32 to provide more intense localized heat along the glass portion adjacent the thin elongated electroconductive portion 16. This heating arrangement causes the glass sheet to develop a sharp bend extending across the glass sheet portion adjacent the thin elongated electroconductive portion 16. Preferably, at the same time, the rest of the glass conforms to the shape of an outline mold. However, if the bend is further complicated, as, for example, by the desire for bending the two main portions to complicated shapes, it may be necessary to perform the shaping in more than one stage. Such multiple stage bending, if needed, is well known in the art and forms no part of the present invention.

Figure 4:
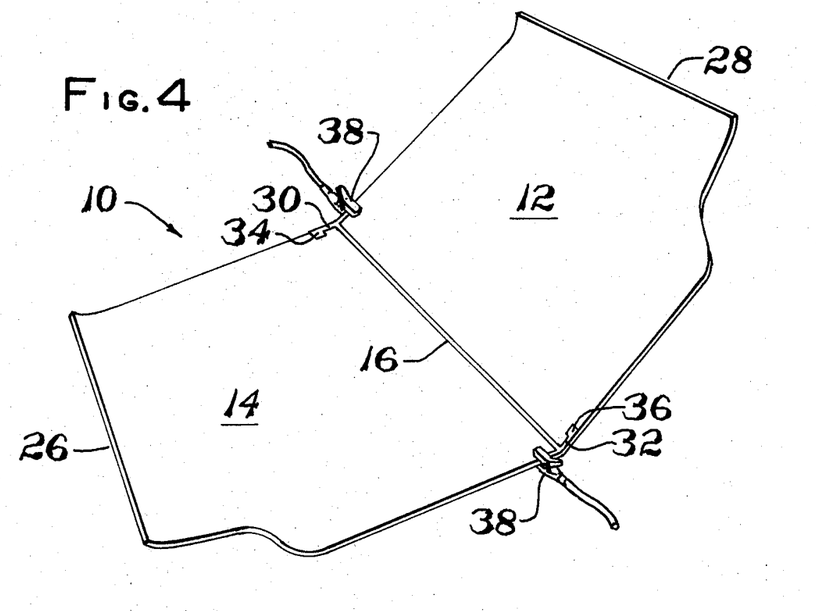
FIG. 4 is a perspective view showing a preferred method of applying electrical heating to a portion to be sharply bent in the formation of a V-shaped windshield.

The conductive first named elongated electroconductive portion 16 is preferably approximately ⅛ inch wide and each additional electroconductive edge portion 30 and 32 that extends along one or the other edge of the glass sheet is preferably provided with a thin central portion contacting one or the other end of the elongated electroconductive portion 16. The thin central portion of each additional electroconductive edge portion is approximately 2 inches long and is preferably symmetrically arranged with respect to its juncture with the ends of the first named elongated electroconductive portion 16. The wider end portions 34 and 36 of the additional electroconductive portions 30 and 32 are a minimum of 1 inch long and ¼ inch wide. The wider end portions can be extended as far as desired for purposes of design and serve as surfaces for clamping electrodes 38 thereto as shown in FIG. 4. The electrodes are connected to a voltage source (not shown) through a switch (not shown) to control the application of a voltage to the first named elongated electroconductive portion 16.

The first named elongated electroconductive portion 16 is preferably ⅛ inch wide and ½ mil thick for a glass sheet 32 inches wide and 100 mils thick where the resistance per unit length of strip 16 is about 0.02 ohms per inch. Different glass sheet dimensions require different optimum widths to provide sufficient localized resistance heating and sufficient width to conceal any optical distortion caused by the sharp bending in the vicinity of the elongated electroconductive portion.

As stated previously, the purpose of having the central portion of the additional electroconductive edge portions of less width than the end portions when the first named elongated electroconductive portion and additional electroconductive edge portions are of the same ceramic silver material is to insure that the edge portion adjacent the ends of the sharply bent portion is heated sufficiently during the formation of the sharp V-bend in the vicinity of the ends of the elongated electroconductive portion 16 so as to avoid fracturing the glass at the top edge 22 or the bottom edge 24.

Figure 5:
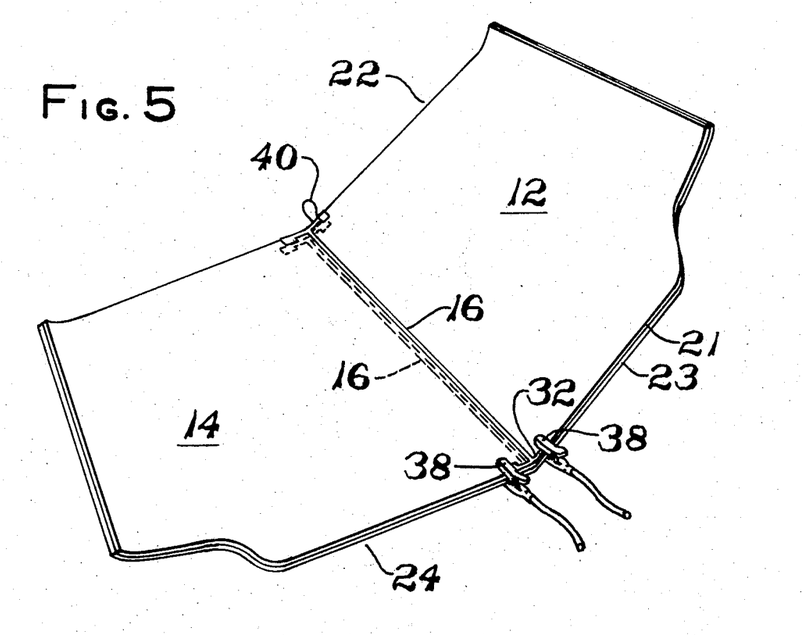
FIG. 5 is a view similar to FIG. 4 showing how the present invention may be applied in the fabrication of a laminated windshield.

In fabricating a laminated window, two aligned glass sheets 21 and 23 are loaded for simultaneous bending as a pair on a bending mold with their frit-coated surfaces facing away from one another and a parting material to prevent fusion disposed therebetween. Electrodes 38 connected to a source of potential (not shown) may be applied to the wider end portions 34 or 36 to provide a pair of parallel heating circuits through upper and lower elongated electroconductive portions 16 in a manner similar to the manner of heating a single glass sheet as shown in FIG. 4. It is noted that the electrodes 38 in this instance are also applied to the wider end portions 34 or 36 in spaced relation to the line of sharp bending.

If desired, the two elongated electroconductive portions 16 may be interconnected to one another by a connecting wire 40 extending from the additional electroconductive edge portion 30 on the upper surface of the upper glass sheet 21 to the additional electroconductive edge portion 30 on the lower surface of the lower glass sheet 23. This puts the two elongated electroconductive portions 16 in series connection and permits the two electrodes 38 to be mounted on the same side of the glass sheet assembly being subjected to simultaneous bending, thereby minimizing the length of lead wires needed outside the glass heating strips 16 to provide a complete circuit. Such a system is depicted in FIGS. 5 and 6.

Figure 6:
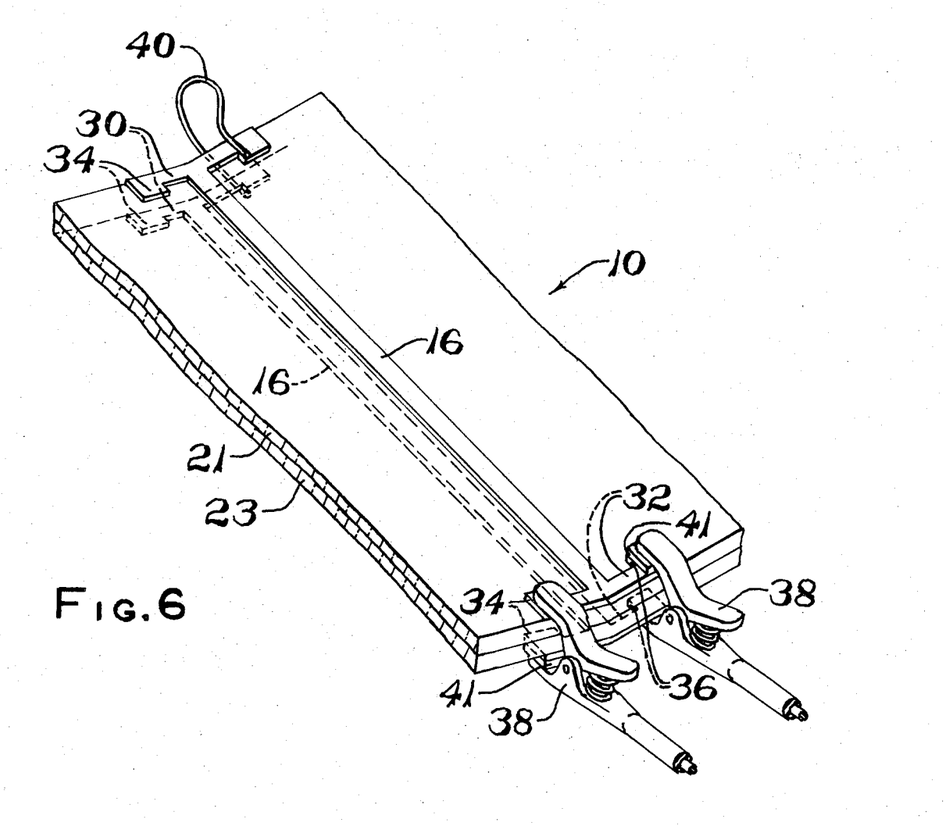
FIG. 6 is an enlargement of a portion of the view of FIG. 5.

In order to avoid having the additional electroconductive edge portions 32 short out the heating circuit between the electrodes in the system depicted in FIGS. 5 and 6, two pads 41 of electrical insulation material, such as fiber glass tape, are used. One pad is interposed between one of the wider portions 34 or 36 of the additional electroconductive edge portion 32 on the upper glass sheet 21 while the other pad 41 is disposed between the other electrode 38 and the respective other wide portion 36 or 34 of the additional electroconductive edge portion 32 on the lower glass sheet 23.

The insulator pads 41 may be dispensed with if one of the wider portions 34 or 36 of the additional electroconductive edge portion 32 is omitted from one of the additional electroconductive edge portions 32 and the other wider portion 36 or 34, respectively, is omitted from the other additional electroconductive edge portion 32 and an operator takes care in clamping electrodes 38 so that one electrode clamped to wider portion 34 of one additional electroconductive edge portion 32 does not contact any portion of the other additional electroconductive edge portion 32 and the other electrode clamped to wider portion 36 of the other additional electroconductive edge portion 32 does not contact any portion of the one additional electroconductive edge portion.

The two glass sheets with the parting material disposed between their uncoated surfaces are supported in superimposed relation on an outline bending mold of the gravity sag type and heated to an elevated temperature. The parting material is preferably of the type disclosed and claimed in U.S. Pat. No. 2,725,320 to Florian V. Atkeson and James S. Golightly, which need not be removed after bending. The outline bending mold may be similar to that disclosed in U.S. Pat. No. 2,999,338 to Ronald E. Richardson except for the difference in shape of the outline shaping surface and the substitution of clamping electrodes for the resistance heaters, which electrodes are clamped as described previously. When the temperature of the glass approximates its strain point, voltage is applied to the elongated electroconductive portions 16 to assist the glass to assume the shape of the supporting mold. When the glass sheets have conformed to the mold shaping surface, the connector strip 40 is snipped at both ends, the cut portion removed, and the two shaped glass sheets are removed from the mold, separated from one another and laminated with a thermoplastic material therebetween to form a complete windshield. A preferable method of laminating glass to plastic is described in U.S. Pat. No. 2,948,645 to Laurence A. Keim.

Figure 7:
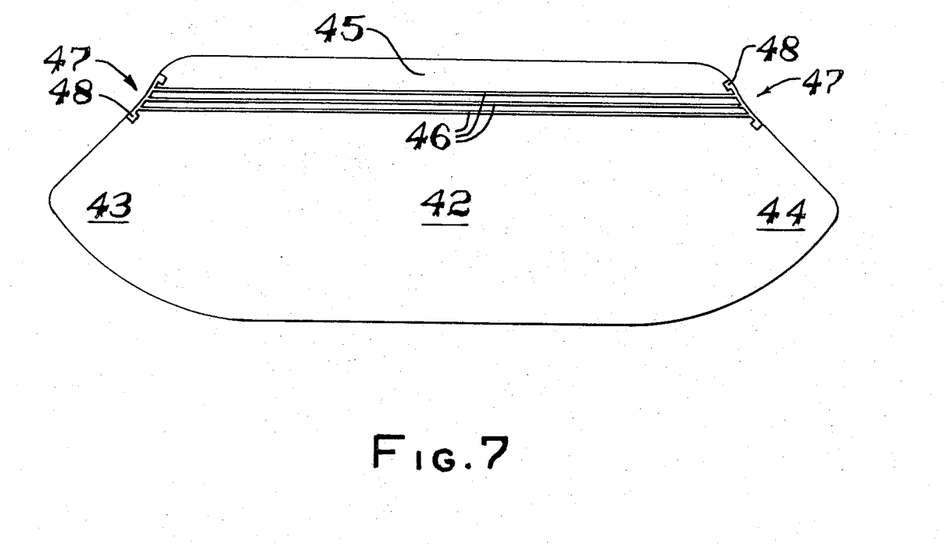
FIG. 7 is a plan view of an alternative embodiment of the present invention showing how the present invention may be employed in fabricating a compound bent windshield.

Referring now to FIG. 7, the presently coated glass sheet has a main central portion 42 merging into longitudinal end portions 43 and 44 adapted to be "wrapped around" the side of a vehicle and an auxiliary portion 45 bent transversely of the main central portion 42 to extend rearward of the vehicle into the roof. Since the radius of curvature between the auxiliary portion 45 and the main portion 42 is not as severe as required in the V-shaped windshield, it is possible to apply a plurality of spaced, thin, elongated electroconductive portions 46 of electroconductive material to a longitudinally extending portion where the auxiliary portion 45 curves away from the main portion 42. The elongated electroconductive portions 46 are connected at each end to the center of an additional electroconductive edge portion 47 having wider end portions 48 remote from the narrow center portions connected to the ends of the thin elongated electroconductive portion 46.

The coated glass sheets are shaped in pairs as is the embodiment of FIGS. 5 and 6, then are separated and reassembled with a sheet of plastic therebetween for final lamination.

While the articles described previously are either monolithic windows of a single glass sheet or a conventional glass-plastic laminate in which a layer of plastic is sandwiched between a pair of glass sheets, the resulting article may also be a bilayer windshield consisting essentially of an outer glass ply and an inner ply of plastic. U.S. Pat. No. 2,184,876 to James H. Sherts and U.S. Pat. No. 3,509,015 to Marco Wismer, Vernon G. Ammons and Michael E. Dufala describe typical examples of bilayer windshields.

Any well known commercial plate, float or sheet glass composition or any other transparent glass generally used in windows is suitable for use in the present invention. Particularly suitable compositions are those of the soda-lime-silica type which may include or exclude a glass tinting composition such as about one-half per cent of iron oxide. The glass sheet is preferably between about 0.05 inch and 0.13 inch thick.

Preferably, the present invention relates to a window which has at least one ply composed of a commercial soda-lima-silica glass such as glasses having the following composition:

|         | Percent By weight |
|---------|-------------------|
| $Na_2O$ | 10–15             |
| $K_2O$  | 0–5               |
| CaO     | 5–15              |
| $SiO_2$ | 65–75             |
| MgO     | 0–10              |
| $B_2O_3$| 0–5               |

A typical soda-lime-silica glass suitable for use in accordance with this invention has the following composition:

|          | Percent by Weight |                           |
|----------|-------------------|---------------------------|
| SiO      | 71.38             | (usual variation 71 to 74%) |
| $Na_2O$  | 12.76             | (usual variation 12 to 14%) |
| $K_2O$   | 0.03              | (usual variation 0 to 1%)   |
| CaO      | 9.67              | (usual variation 8 to 12%)  |
| MgO      | 4.33              | (usual variation 2 to 5%)   |
| $Na_2SO$ | 0.75              | (usual variation 0.1 to 1.0%) |
| $Fe_2O_3$| 0.15              | (usual variation 0.1 to 1.0%) |
| $Al_2O_3$| 0.81              | (usual variation 0.1 to 1.0%) |

The plastic layer of a laminated window is selected from those materials which are flexible, optically transparent and, for bilayer windshields, are somewhat abrasion resistant. Further, the plastic materials, when laminated to a thin ply of glass to form a laminated window, should minimize the dangers of both lacerative and concussive injuries. To fulfill these latter two requirements, the plastic innerlayer material should be flexible, should have a good tensile strength and should adhere well to the outer glass ply at ambient conditions. The plastic layer should be flexible such that when the windshield is impacted by a passenger's head cracking the outer glass ply, the plastic innerlayer can stretch and act as a diaphragm, thereby absorbing impacting energy and minimizing concussive injury. The plastic innerlayer should have good tensile strength to minimize tearing, thereby providing resistance to penetration of the closure, because serious lacerative injury can occur if the passenger's head penetrates the closure during an automobile accident.

Accordingly, the plastic sheeting material should have abrasion resistance as measured by A.N.S.I. Code Z 26.1 Test No. 18 for plastics, of no more than 15 percent increase in haze after 100 Taber cycles on a Taber abrader. For flexibility, the plastic innerlayer should have a Gehman modulus between $10^6$ and $10^{10}$, preferably between $10^{8.5}$ and $10^{9.1}$ dynes per square centimeter from 0°–120°F., as measured according to A.S.T.M. D-1053-65. The plastic innerlayer should have a tensile strength of at least 1,000 pounds per square inch, preferably 2,000 to 5,000 pounds per square inch, as measured by A.S.T.M. D-638-64T. For adherence, the plastic innerlayer material should laminate to the strengthened glass sheet with a bond strength of 10 to 60, preferably 20 to 30, pounds per lineal inch as measured by the 90° Peel Test according to a slightly modified A.S.T.M. D-1876-61T procedure. The modification to the A.S.T.M. procedure consists of imposing a stainless steel wire screen in the exposed surface of the plastic. The purpose of the screen is to prevent the plastic innerlayer from stretching as it is peeled from the surface.

Plastic innerlayer compositions which have been found to possess the above characteristics are polyurethane resins, both thermoplastic and thermosetting type, with the thermoplastic type being preferred. Thermoplastic polyurethanes are available as preformed sheets, whereas the thermosetting polyurethanes are preferably cast as a liquid against a glass sheet and cured in place while held in such a relation to the glass.

The polyurethane materials are particularly useful because of their flexibility and good tensile properties. Further, they are transparent, have good abrasion resistance, are impervious to atmospheric conditions and maintain a strong laminate bond with the tempered glass for indefinite periods of time. By thermosetting-type polyurethane is meant one in which there is cross-linking among polyurethane chains. Such cross-linking occurs, for example, in the curing of so-called polyurethane "prepolymers", which are linear, isocyanate-terminated polycarbamate esters of a diisocyanate and a diol, with a tri-functional curing agent such as a glycol having three or more hydroxyl groups and/or a polyamine having three or more amino groups. A thermoplastic polyurethane is one which contains only substantially linear polyurethane chains with essentially no, or only minimal, cross-linking among the chains. The thermoplastic polyurethanes flow under the influence of heat and pressure and can be therefore extruded or calendered in sheet form. The thermosetting polyurethanes, on the other hand, because of the cross-linking among the individual polymer chains, do not flow well under the influence of heat and pressure, and if extruded or calendered, have extrusion lines and roll marks from calendering. The lines and roll marks cause distortion and haze in the transparent plastic, making them unacceptable for bilayer motor vehicle windshield applications. Thus, thermosetting polyurethanes must be either cast as a liquid and cured in place against the outer strengthened glass, or precast in an environment which gives a pre-formed sheet with uniform thickness and no optical distortion. Such techniques are described below.

Polyurethanes of the thermosetting type used in this invention are described in U.S. Pat. No. 3,509,015, which is hereby incorporated by reference, and are typically the reaction product of an organic polyisocyanate and a glycol, which is cross-linked with an organic compound having at least three active hydrogen atoms. Preferably, an isocyanate-terminated prepolymer which is formed from the reaction of an organic polyisocyanate and a glycol is first formed. This prepolymer forms one package of a two-package system. The curing agent forms the other package. Immediately before use, the two packages are mixed.

The preferred thermoplastic types of polyurethanes are prepared by reacting an organic polyisocyanate with a long chain glycol and a compound containing two active hydrogen atoms per molecule reactive with the isocyanate groups. Reaction is conducted until a solid, but still thermoplastic material is obtained. Then the reaction is interrupted, and the plastic is extruded, calendered or pressed into a sheet. Thermoplastic polyurethanes and manufacturing techniques are described in U.S. patent application Ser. No. 154,944, filed June 21, 1971, the disclosure of which is incorporated herein by reference.

As a substitute for the polyurethanes described above, the transparent plastic material of the plastic ply of the "bilayer windshield" and the like may be a polyvinyl acetal such as plasticized polyvinyl butyral resin coated with a thin film of protective material such as the unplasticized resin. Plasticized polyvinyl acetal resins have the required transparency, tensile strength and flexibility also found in polyurethane resins. Polyvinyl butyral is prepared as recited in U.S. Pat. No. 2,400,957 to Stamatoff, and is commonly used as the interlayer of laminated glass windshields because of its adhesion to glass when subjected to suitable temperatures and pressure, because it is transparent when bonded between two sheets of glass and because of its resistance to elongation whenever an object impacts upon a laminated safety glass window such as the multilayer safety glass laminate described herein.

The polyvinyl acetal resins may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be used. In general, the acetal resin is made by reacting an aldehyde with hydrolyzed polyvinyl ester in the presence of a solvent with a product and precipitating the resin product with water. Alternate methods might include carrying out the reaction in the presence of a non-solvent dispersing medium such as water or a non-solvent mixture of water and solvent, for example, a water-ethanol mixture. In general, polyvinyl acetal resins made from saturated or unsubstituted aliphatic aldehydes are the most suitable. These would include polyvinyl acetal resins made from unsubstituted saturated aliphatic aldehydes containing less than 6 carbon atoms and especially those made from formaldehyde, acetaldehyde, butyraldehyde, and mixtures thereof. Particularly preferred are polyvinyl acetal resins made from butyraldehyde, the so-called polyvinyl butyral, the preferred molecular weight range is from 150,000 to 250,000. The polyvinyl acetal resins may be considered to be made up on a weight basis of from 5 to 25 percent hydroxyl groups, calculated as polyvinyl alcohol, 0 to 40 percent acetate groups, calculated as polyvinyl acetate and the balance being essentially acetal. When the acetal is butyraldehyde acetal, the polyvinyl acetal resin will preferably contain on a weight basis, from 16 to 25 percent hydroxyl groups calculated as polyvinyl alcohol and from 0 to 10 percent acetate groups calculated as polyvinyl acetate, the balance being essentially butyraldehyde acetal. Polyvinyl acetal resins, particularly polyvinyl butyral, are well known in the art as efficient innerlayers for laminated safety glass windshields. Therefore, further description of the polyvinyl acetal resins is not necessary, as those skilled in the art are well aware of these materials and their methods of preparation. More details on the preparation of polyvinyl acetal resins are found in U.S. Pat. Nos. Re. 20,430 and 2,496,480.

Conventionally, polyvinyl acetals, particularly polyvinyl butyral as used in safety-glass laminates, contains a plasticizer. Generally, the plasticizer used is a water-insoluble ester of a polybasic acid and a polyhydric alcohol. Particularly desirable plasticizers for use in the present invention are triethylene glycol di(2-ethyl butyrate), dibutyl sebacate, di(beta-butoxy-ethyl) sebacate and dioctyl phthalate.

Various plasticized polyvinyl acetal resins are described in detail in U.S. Pat. No. 2,372,522.

Many well-known plasticizers suitable for use with polyvinyl butyral are disclosed in U.S. Pat. No. 2,526,728 to Burk et al. The most commonly used are monocarboxylic aliphatic acid esters of ether glycols, such as triethylene glycol di-2 ethyl butyrate.

Generally, the plasticizers used are water-insoluble esters of a polybasic acid or a polyhydric alcohol. Particularly desirable plasticizers for use in the present invention are triethylene glycol di(2-ethyl-butyrate), dibutyl sebacate, di(beta-butoxy-ethyl) adipate, and dioctyl phthalate. Other suitable plasticizers include triethylene glycol fully esterified with a mixture of 80–90 percent caprylic acid and 10–20 percent capric acid as described in U.S. Pat. No. 2,372,522, dimethyl phthalate, dibutyl phthalate, di(butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known.

It should be mentioned that although the polyvinyl acetal resins can be used in the practice of this invention certain precautions should be taken when using these innerlayer materials. The materials are particularly susceptible to moisture and if care is not taken, the moisture will permeate the polyvinyl acetal innerlayer and weaken the bond between the innerlayer and the outer glass ply. To prevent this, a thin, protective moisture-resistant coating can be imposed on the exposed surface of the polyvinyl acetal sheet. Such a protective coating would be, for example, the unplasticized polyvinyl acetal as in the aforesaid U.S. Pat. No. 2,184,876 to J. H. Sherts, which could be applied by conventional spraying or brushing techniques.

Also, the exposed surface of the polyvinyl-acetal innerlayer could be protected by vapor depositing a surface layer of $SiO_2$ thereon. Such a technique is described in British Patent No. 1,144,099.

Further, the exposed surface of the polyvinyl acetal innerlayer could be protectively coated with a thin polyurethane layer of the type described above.

The inner plastic ply is of uniform thickness from about 10 to 75 mils thick, but is preferably about 20 to 50 mils in thickness. Inner plastic plies of less than 10 mils in thickness are not recommended because thin plastic sheets of less than 10 mils thickness tear easily upon impact. Tearing decreases penetration resistance of the laminated structure, which presents the danger in a motor vehicle of an occupant being partially or completely ejected in an accident. Inner plastic plies of greater than 75 mils in thickness should not be used because they result in a more rigid laminated structure which increases the danger of concussive injuries upon head impact. Also, thicker plastic plies increase the weight of the resultant laminated structure and reduce light transmittance.

The following compositions, whose analyses are recorded in parts by weight, have been used as compositions for applying to a glass surface which, on heating to volatilize the oil vehicle, became first named elongated electroconductive portions 16 and additional electroconductive edge portions 30 and 32 in making V-shaped windows according to the teachings of the present invention. In Table I that follows, their coefficient of linear thermal expansion is reported per degree Centigrade and the resistance per unit length is reported for a strip about ½ mil thick and ⅛ inch wide.

TABLE I

COMPOSITIONS OF ELECTROCONDUCTIVE PORTIONS

| INGREDIENT | COMPOSITION 1 | COMPOSITION 2 | COMPOSITION 3 |
|---|---|---|---|
| Finely divided silver | 84% | 65% | 75% |
| Finely divided lead-boro-silica frit | 2.6% | 20% | |
| Oil vehicle | 13.4% | 15% | 25% |
| Coefficient of thermal expansion ($\times 10^{-7}$) | 85 | 50 to 55 | 189 |
| Resistance per unit length (ohms per inch) | .01 | .02 | .04 | ously to the upward facing surface of the upper sheet and the lower surface of the lower sheet. Each electroconductive elongated portion was ⅛ inch wide and the additional electroconductive edge portions had thin central portions ⅛ inch wide extending 1 inch in each direction from their points of contact to the respective ends of the elongated electroconductive portions along an edge of the respective glass sheet to form a remote portions ¼ inch wide extending further along the respective glass sheet edges. Electrodes were connected to a remote portion of each additional electroconductive edge portions to form two heating circuits arranged in parallel along the elongated electroductive portions applied to the glass surfaces. The elongated electroconductive portions and the electroconductive edge portions were about ½ mil thick in each instance.

The glass-laden mold was introduced into a lehr maintained at a lehr temperature recorded in Table II. A thermocouple attached to the upper glass sheet surface about three to four inches from the elongated electroconductive portion and approximately midway between the side edges of the attached glass sheet recorded the glass temperature. When the recorded temperature reached a value listed as power application temperature, alternating current was applied between the electrodes at a recorded voltage for a period of seconds listed in Table II. The resulting maximum current in amperes and peak power in watts for each run is also tabulated in Table II. After bending was completed, the bent sheets were annealed by controlled cooling.

In contrast, several failures occurred such as glass sheet breakage during heating or during annealing using other materials. One failure was attributed to failure to make contact with the bottom elongated electroconductive portion. Others happened during cooling when the glass chipped in the vicinity of elongated electroconductive portion composed of a commercially available silver-ceramic frit sold under the trademark Table II

DETAILS OF SUCCESSFUL BENDING TRIALS

| COMPOSITION OF PATTERN | INITIAL LEHR TEMPERATURE (°F.) | POWER APPLICATION TEMPERATURE (°F.) | TIME POWER APPLIED (SECONDS) | A.C. VOLTS | MAXIMUM CURRENT (AMPERES) | PEAK POWER (WATTS) |
|---|---|---|---|---|---|---|
| 1 | 800 | 910 | 660 | 13 | 28.5 | 371 |
| a3 | 800 | 980 | 630 | 22¼ | 10 | 223 |
| 1 | 800 | 980 | 890 | 25 | 27 | 675 |
| 1 | 800 | 975 | 917 | 28.5 | 30 | 855 |
| b1 | 800 | 975 | 781 | 26 | 28 | 728 |
| 2 | 800 | C | 800 | 35.5 | 24 | 852 |
| 1 | 800 | 960 | 632 | C | 15 | C |

Notes: a—lost top elongated electroconductive portion
b—lost one elongated electroconductive portion
c—not available

EXAMPLES

The following examples report several successful experiments to produce V-shaped bends in two glass sheets simultaneously. In each example, a pair of float glass sheets approximately 100 mils thick were mounted on a sectionalized outline bending mold with a parting material of a diatomaceous earth therebetween. An electroconductive elongated portion and additional elongated edge portions were applied previof "OHommel AB". Other failures could happen when a frit of non-matching expansion coefficient was applied in greater thickness than 1 mil.

The form of the invention shown and described in this disclosure represents an illustrative preferred embodiment and certain modifications thereof. It is understood that various changes may be made, such as substituting strips of noble metals or noble metal alloys having sufficient ductility to compensate for some mismatch in thermal expansion coefficient, such as gold, platinum, rhodium, iridium, osmium, palladium or ruthenium and alloys of two or more of these metals, for silver or metalo-ceramic frit and that the width of the additional electroconductive edge portions may increase gradually rather than abruptly from the relatively narrow portion connected to an end of the first named elongated electroconductive portions to a wider, remote portion of sufficient width to insure adequate clamping of an electrode to said wider, remote portion, as well as other changes that will become apparent from readng this specification, without departing from the gist of the invention as defined in the claimed subject matter that follows.

We claim:

1. An article comprising a glass sheet having a glass sheet portion adapted to be sharply bent extending from edge to edge across a dimension of said glass sheet, a layer of electroconductive material on a surface of said sheet arranged in an electroconductive pattern comprising an elongated electroconductive portion having a given electroconductivity per unit length bonded to said glass sheet portion to be sharply bent and approximately coextensive in length therewith, and an edge portion of electroconductive material bonded to said glass sheet and extending from each end portion of said elongated electroconductive portion along an edge portion of said glass sheet, said electroconductive edge portion including a less conductive edge portion whose electroconductivity per unit length is approximately equal to that of the first named elongated electroconductive portion contacting an end portion of said first named elongated electroconductive portion and a more conductive electroconductive edge portion, whose electroconductivity per unit length is greater than that of said elongated electroconductive portion, remote from said elongated electroconductive portion, said pattern being so constructed and arranged that when electroconductive energy is applied to said electroconductive pattern to heat said electroconductive material, the temperature gradient along the edge portions of the glass in the vicinity of the end portions of said first named elongated electroconductive portion is not so steep as to cause the glass to break from thermal stress.

2. An article as in claim 1, wherein one of said electroconductive edge portions extends away from said first named elongated electroconductive portion along one edge portion of said article and the other of said electroconductive edge portions extends away from said first named elongated electroconductive portion along an edge portion of said article opposite said one edge portion of said article.

3. An article as in claim 1, wherein each said electroconductive edge portion is symmetrical with respect to one or the other end of said first named elongated electroconductive portion and comprises a relatively narrow electroconductive center edge portion contacting said first named elongated electroconductive portion and wider electroconductive end edge portions spaced from said elongated electroconductive portion.

4. An article as in claim 1, wherein said electroconductive pattern is composed of a metalo-ceramic composition.

5. An article as in claim 4, wherein said metalo-ceramic composition has a coefficient of thermal expansion that is between about 45 to 90 times $10^{-7}$ per degree Centigrade, whereby its said coefficient is compatible with that of said glass sheet.

6. An article as in claim 1, wherein said pattern is composed of a noble metal or a noble metal alloy.

7. An article as in claim 6, wherein the noble metal is silver.

8. An article as in claim 1, wherein said glass sheet is sharply bent along said dimension of said sheet to form a bent window.

9. A window as in claim 8, further comprising a second glass sheet conforming in shape and outline to said first named glass sheet and means adhering said glass sheets to one another in aligned relationship.

10. A window as in claim 9, wherein said adhering means is a polyvinyl acetal.

11. A window as in claim 9, wherein said adhering means is a polyurethane resin.

12. A window as in claim 9, wherein each of said glass sheets is provided with a pattern of electroconductive material comprising an elongated electroconductive portion bonded to its said sharply bent portion, and one of said electroconductive edge portions at each end of said elongated electroconductive portion bonded to said first glass sheet extends in a different direction from the direction in which the corresponding electroconductive edge portion extends from said elongated electroconductive portion bonded to said second glass sheet.

13. A window as in claim 8, further comprising a sheet of flexible plastic resin bonded to a surface of said glass sheet.

14. A window as in claim 13, wherein said resin is a polyvinyl acetal.

15. A window as in claim 13, wherein said resin is a polyurethane resin.

16. A window as in claim 8, wherein said elongated electroconductive portion is disposed along an elongated valley formed on the surface of said glass sheet forming said sharply bent glass sheet portion.

17. A window as in claim 8, wherein each said electroconductive edge portion is symmetrical with respect to one or the other end of said first named elongated electroconductive portion and comprises a relatively narrow electroconductive center edge portion contacting said first named elongated electroconductive portion and wider electroconductive end edge portions spaced from said elongated electroconductive portion.

18. A window as in claim 8, wherein said electroconductive pattern is composed of a metalo-ceramic composition.

19. A window as in claim 18, wherein said metalo-ceramic composition has a coefficient of thermal expansion that is between about 45 to 90 times $10^{-7}$ per degree Centigrade, whereby its said coefficient is compatible with that of said glass sheet.

20. A window as in claim 8, wherein said pattern is composed of a noble metal or a noble metal alloy.

21. A window as in claim 20, wherein the noble metal is silver.

22. A window as in claim 8, wherein said sharply bent glass sheet portion extends across the width of said glass sheet to form two main glass sheet portions symmetrically arranged with respect to said sharply bent glass sheet portion.

23. A window as in claim 22, further including a second glass sheet conforming in shape and outline to said first named glass sheet and means adhering said glass sheets to one another in aligned relationship.

24. A window as in claim 22, comprising a layer of plastic resin bonded to said glass sheet.

25. In a method of bending a glass sheet to a sharp bend comprising applying a layer of electroconductive material to a surface of said sheet arranged in an electroconductive pattern comprising an elongated electroconductive portion having a given electroconductivity per unit length along a line about which it is desired to bend said sheet, applying an electrical voltage across said line of a sufficient magnitude and for sufficient duration to heat said sheet in the vicinity of said line to a temperature at which said glass bends to form said sharp bend, the improvement comprising applying an additional edge portion of electrically conductive material to said surface along an edge portion of said glass sheet in electrical contact with said first named elongated electroconductive portion and extending along said glass sheet edge portion from each end of said first elongated electroconductive element, each said additional electroconductive edge portion having a first electroconductive portion having an electroconductivity per unit length approximately equal to that of said first named elongated electroconductive portion in electrical contact with one or the other end of said first named elongated electroconductive portion and a second electroconductive portion having a greater electroconductivity per unit length than that of said first named elongated electroconductive portion remote from said first named elongated electroconductive portion and making electrical contact at said second portion with an electrode connected to a source of said electrical voltage to apply said electrical voltage across said first named elongated electroconductive portion, whereby when said voltage is applied to said electroconductive pattern, the temperature gradient along the edge portions of the glass in the vicinity of the end portions of said first named elongated electroconductive portion is not so steep as to cause the glass to break from thermal stress.

26. The improvement as in claim 25, wherein said electrode is clamped to said second electroconductive portion.

27. The improvement as in claim 25, wherein said first named elongated electroconductive portion and said additional electroconductive edge portions have substantially equal thickness and are applied in the same application step.

28. In the method as in claim 25, the improvement comprising applying a layer of electroconductive material arranged in said electroconductive pattern on a surface of a second glass sheet conforming to said first glass sheet, aligning said glass sheets so that said elongated electroconductive portions are aligned with one another, supporting said first and second glass sheets in shaping relation to a glass sheet bending mold with said elongated electroconductive portions aligned and parting material disposed between said glass sheets, shaping said glass sheets into conformity with said bending mold to form bent glass sheets, assembling said bent glass sheets with interlayer material therebetween and applying sufficient heat and pressure to said assembly so formed to laminate said glass sheets to said interlayer material.

29. In the method as in claim 25, the further step of laminating said bent glass sheet to interlayer material comprising polymeric material taken from the class consisting of polyurethanes and polyvinyl butyral.

* * * * *